US007266231B2

(12) United States Patent
Christophersen et al.

(10) Patent No.: US 7,266,231 B2
(45) Date of Patent: Sep. 4, 2007

(54) METHOD AND APPARATUS FOR IDENTIFYING DOCUMENTS

(75) Inventors: Bryan James Christophersen, Hampshire (GB); Peter Dilwyn Evans, Hampshire (GB); Jeremy Stuart Michael Fox, Hampshire (GB); John Alan Skinner, Hampshire (GB)

(73) Assignee: De La Rue International Limited, Hampshire (GB)

( * ) Notice: Subject to any disclaimer, the term of this patent is extended or adjusted under 35 U.S.C. 154(b) by 710 days.

(21) Appl. No.: 10/467,659

(22) PCT Filed: Feb. 26, 2002

(86) PCT No.: PCT/GB02/00836

§ 371 (c)(1),
(2), (4) Date: Sep. 22, 2003

(87) PCT Pub. No.: WO02/071348

PCT Pub. Date: Sep. 12, 2002

(65) Prior Publication Data

US 2004/0218800 A1 Nov. 4, 2004

(30) Foreign Application Priority Data

Mar. 7, 2001 (GB) ................................ 0105612.6

(51) Int. Cl.
*G06K 9/00* (2006.01)

(52) U.S. Cl. ........................ 382/137; 356/71; 250/556

(58) Field of Classification Search ................ 382/135, 382/136, 137, 138, 139, 140, 35; 194/206, 194/207; 209/534, 546, 551, 577, 587, 588; 356/71, 73; 250/556; 348/185, 180, 181; 235/379

See application file for complete search history.

(56) References Cited

U.S. PATENT DOCUMENTS

| | | | | |
|---|---|---|---|---|
| 4,127,328 | A | 11/1978 | Gorgone et al. | |
| 4,542,829 | A | 9/1985 | Emery et al. | |
| 5,875,259 | A * | 2/1999 | Mennie et al. | 382/135 |
| 6,980,684 | B1 * | 12/2005 | Munro et al. | 382/135 |

* cited by examiner

*Primary Examiner*—Samir Ahmed
*Assistant Examiner*—Abolfazi Tabatabai
(74) *Attorney, Agent, or Firm*—Oliff & Berridge, PLC

(57) ABSTRACT

A method and apparatus for identifying a document (55). The method comprises exposing the document (55), such as a banknote, to infrared radiation; detecting infrared radiation reflected from a plurality of regions of the document (55) to generate at least one test pattern; determining if the or each test pattern satisfies a predetermined relationship with a predetermined pattern or patterns corresponding to a known document; and, if the predetermined relationship is satisfied, identifying the document (55) as being the same as the known document.

18 Claims, 5 Drawing Sheets

METHOD AND APPARATUS FOR IDENTIFYING DOCUMENTS

The invention relates to a method and apparatus for identifying a document, typically a document of value such as a banknote, travellers cheque, postal order and the like.

A variety of security document handling equipment has been developed over many years. Typical examples are sorters, counters, validators, dispensers, acceptors and recirculators. Often this equipment needs to identify the documents (e.g. banknote denomination) and this has often been achieved by detecting the size of banknotes (where different denominations have different sizes) and by detecting visible light patterns on the documents for comparison with predetermined references, as in U.S. Pat. No. 4,542,829.

In addition, checks are also made that the documents are genuine and this is commonly achieved by monitoring the UV and IR characteristics of the documents, typically their reflective and/or transmissive response to such irradiation. Examples are described in U.S. Pat. No. 4,127,328, EP-A-0083062, EP-A-0679279, U.S. Pat. No. 4,296,326 and EP-A-0807904.

In large scale document handling equipment, sophisticated detectors can be incorporated for determining identity and authenticity as well as other properties such as degree of soil and the like. Recently, a number of more compact banknote counters have been developed which are able to determine denomination and authenticity and which transport the banknotes either to a single output hopper or to a limited number of output hoppers, for example just two or three. Examples include the De La Rue 2700 and 2800 machines.

There is a need to reduce the size and complexity of this equipment.

In accordance with a first aspect of the present invention, a method of identifying a document comprises exposing the document to infrared radiation; detecting infrared radiation reflected from or transmitted through a plurality of regions of the document to generate at least one test pattern; determining if the or each test pattern satisfies a predetermined relationship with a predetermined pattern or patterns corresponding to a known document; and, if the predetermined relationship is satisfied, identifying the document as being the same as the known document.

In accordance with a second aspect of the present invention, document handling apparatus comprises an infrared inspection station; a transport system for transporting documents past the inspection station, the inspection station comprising an infrared radiation emitter and an infrared radiation receiver for detecting infrared radiation reflected from or transmitted through a document; and a control system coupled to the transport system and the infrared inspection station to generate at least one test pattern from the infrared radiation reflected from or transmitted through a plurality of regions of the document, to determine if the or each test pattern satisfies a predetermined relationship with the predetermined pattern or patterns corresponding to a known document, and, if the relationship is satisfied, to identify the document as being the same as the known document, and thereafter to control the transport system accordingly.

In this new approach, we have realised that it is possible with certain documents such as banknotes, for example US and Spanish currency, to determine identification by reference to reflected or transmitted infra-red radiation properties of the documents. In this way, it is possible not only to determine identification but also authenticity using the same infra-red response or at least the same infra-red inspection station and thus reduce the size and complexity of the apparatus. Typically the same information will be used for both identification and authenticity but in some cases i.r. reflection could be used for identification and i.r. transmission for authenticity or vice versa, or i.r. information from different parts of the document could be used for identification and authenticity respectively.

Although in most cases, the “identity” of the document refers to its denomination or value in the case of banknotes, it can include also or instead orientation or issue.

In addition, the invention enables a new form of non-contact detection to be introduced into the document counting product environment that provides enhanced authentication that was previously only found in the much higher cost document sorting arena. The non-contact nature of the detector provides the advantage that document guiding constraints are minimized and the range of documents that can be processed is maximized.

Although a primary advantage of the invention is that the infra-red response of the document can be used to determine identification, the method could be used in conjunction with a conventional identification detection system such as a visible pattern recognition system to produce additional confirmation of the identity.

The regions which are inspected may be arranged in an irregular or regular array and could be on one or both sides of the document. In the preferred approach, the whole of at least one side of a document is inspected.

The intensity information obtained can be processed in any conventional way. For example, the pattern may be compared using conventional comparison algorithms with one or a number of predetermined patterns corresponding to different identities, issues and/or orientations of documents. Alternatively, the test pattern could be applied to a previously generated neural network which has been trained with the range of genuine documents which are to be identified.

The method can be implemented in a variety of document handling apparatus but is particularly suited for simple document counters having one or a limited number of output locations.

In one example, the infrared inspection station comprises two sets of infrared emitters and detectors arranged on opposite sides of the transport path so as to view opposite sides of the documents. This enables a more accurate determination of identity to be determined since two patterns will be generated from one document. Conveniently, the arrays are offset from one another in the transport direction so as to minimize interference between the two. This also enables each array to be arranged opposite a black reference surface.

Some examples of methods and apparatus according to the invention will now be described with reference to the accompanying drawings, in which.

Figure 1:
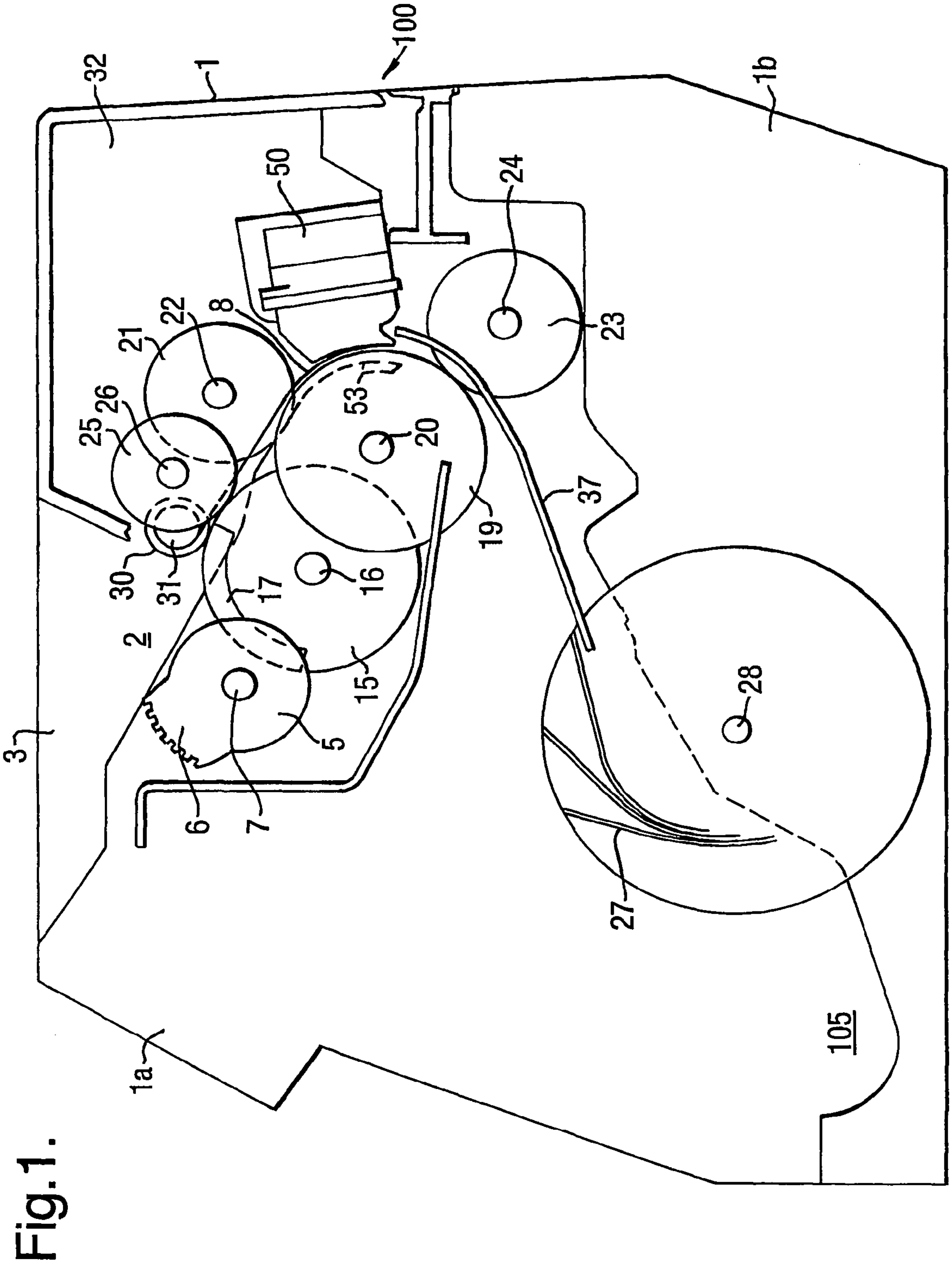
FIG. 1 is a schematic diagram showing the primary transport components of a first example of a banknote counter.

FIG. 1 illustrates a banknote counter 100 having an input hopper 2 mounted beneath an inlet opening 3 in an enclosure 1 which comprises upper and lower parts 1*a*, 1*b* normally screwed together. Contained within the enclosure 1 is an internal chassis assembly (not shown for clarity) which itself has side members between which the sheet feeding and transport components to be described herein, are mounted. Two conventional feed wheels 5 are non-rotatably mounted on a shaft 7, which is rotatably mounted to the chassis assembly, and have radially outwardly projecting bosses 6 which, as the feed wheels rotate, periodically protrude through slots in the base of the hopper 2.

A pair of stripper wheels 15 are non-rotatably mounted on a drive shaft 16 which is rotatably mounted in the chassis assembly. Each stripper wheel 15 has an insert 17 of rubber in its peripheral surface. Shaft 16 is driven clockwise by a motor 200 (FIG. 4) to feed notes individually from the bottom of a stack of notes placed in the hopper 2.

Transversely in alignment with, and driven from the circumferential peripheral surface of the stripper wheels 15, are pressure rollers 30 which are rotatably mounted on shafts 31 spring-biased towards the stripper wheels 15. Downstream of the wheels 15 is a pair of transport rollers 19 non-rotatably mounted on a shaft 20 rotatably mounted in the chassis assembly. Each roller 19 has a cylindrical form with a constant radius along its axis. Shaft 20 is driven clockwise from a second motor (not shown) to transport the note in the transport arrangement, in conjunction with pairs of pinch rollers 21,23 into stacking wheels 27 and hence output hopper 105. Pinch rollers 21, rotatably mounted on shafts 22 spring based towards the transport rollers 19, transversely align with rollers 19 and are driven by the peripheral surface of the rollers 19. The rollers 23, rotatably mounted on shafts 24 are in alignment with the transport rollers 19, and are essentially caused to rotate by the note passing between the adjacent peripheral surfaces of the rollers 19 and 23.

Situated between the pressure rollers 30 and pinch rollers 21 are separator roller pair 25, non-rotatably mounted on shaft 26 adjustably fixed to a top moulding assembly 32, having a circumferential peripheral surface which is nominally in alignment with the peripheral circumferential surface of, but transversely separated from, the stripper wheels 15.

Also forming part of the top moulding assembly 32, is a curved guide surface 8 extending partly around the circumference of the rollers 15, 19 which, when the top moulding is lifted allows the operator access to the note feed and transport path so that a note jam can be cleared. A surface 37 provides note guiding from the end of the curved guide surface 8 to the conventional stacking wheels 27.

The drive shaft 16 is continuously driven, and this, via a belt and pulley arrangement from shaft 16, causes the auxiliary drive shaft 7 rotating the feed wheel 5 also to be driven. Drive shaft 20, rotating the transport rollers 19, is driven by the other drive motor. A further pulley and belt arrangement (not shown) between shaft 20 and shaft 28, on which the stacking wheels 27 are non-rotatably mounted, provides the drive to the stacking wheels 27.

The guide plate 8 extends as a continuation of the base of the hopper 2 towards the nips formed between the transport rollers 19 and the rollers 23.

Figure 2:
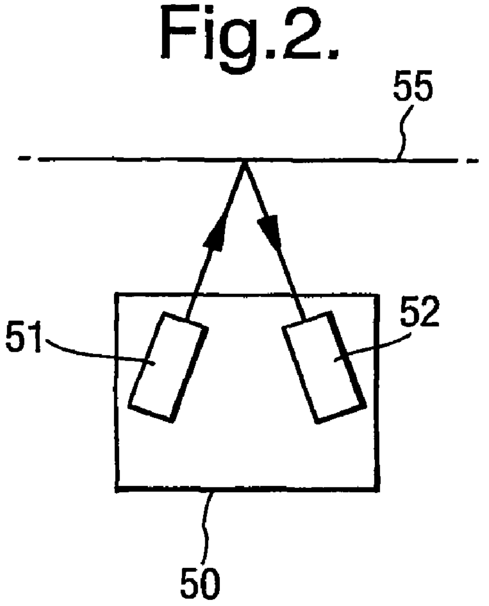
FIG. 2 is a schematic block diagram of an infrared head.
Figure 3:
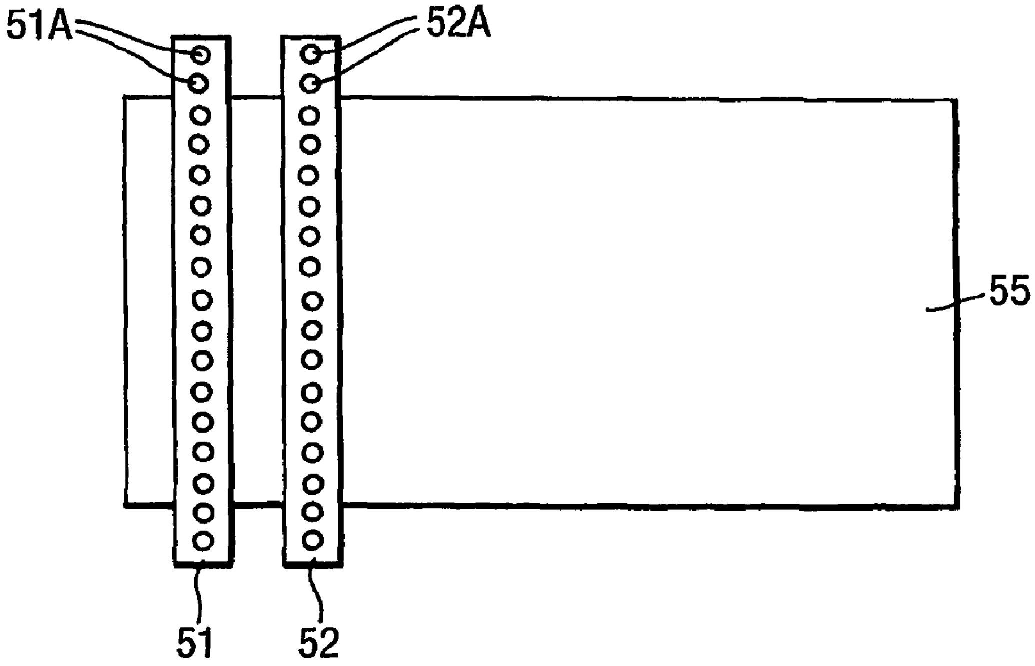
FIG. 3 illustrates schematically the appearance of the relationship between an infra-red head and a banknote.
Figure 4:
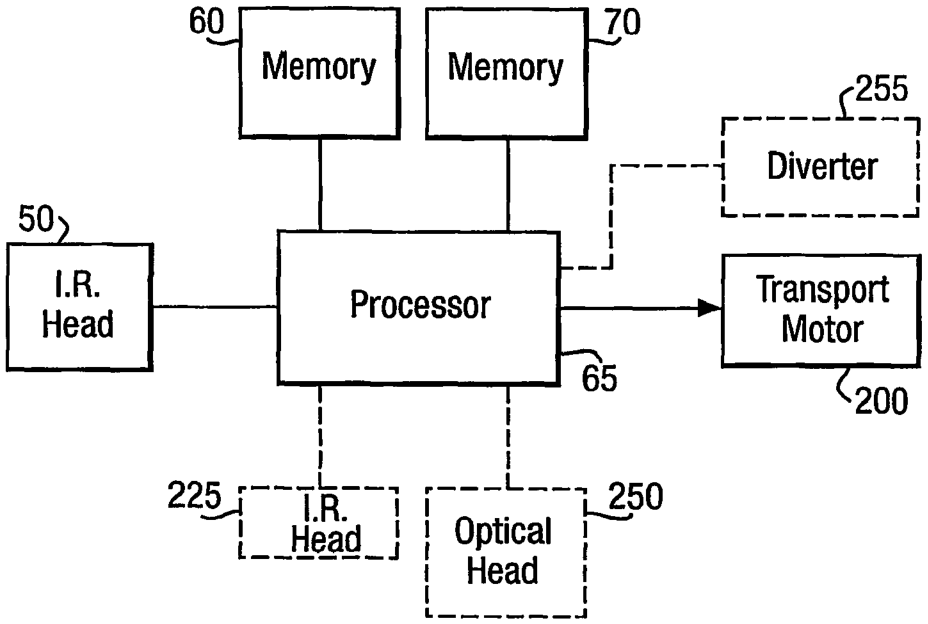
FIG. 4 is a block diagram of the control system.

An infra-red head 50 is mounted downstream of the rollers 21 and includes a linear array of infra-red emitting diodes 51 (FIG. 2) and a linear array of, typically 144, photodiodes 52. In particular, the linear array 51 typically comprises 92 LEDs extending collectively a length of about 9" (23 cms) while the linear array of photodiodes 52 extends a comparable length (FIG. 3). The LEDs are preferably Forge Europa FT-N102W and the photodiodes are preferably the Photodiode Array #180381-8 (available from UDT). The head 50 is located opposite to a reference black surface forming part of the note guide as illustrated at 53. It will be appreciated that the head 50 and surface 53 are laterally offset from the rollers 19. As a banknote 55 is conveyed by the transport system, it will pass beneath the head 50 and be irradiated by the light emitting diodes 51 with infra-red radiation. This radiation is reflected by the banknote in dependence upon the materials on or in the banknote, the reflected radiation being detected by the photodiodes 52. The output signals from the photodiodes 52 are regularly sampled so as to generate a set of intensity values for each region or pixel of the banknote 55, this information being stored in a memory 60 (FIG. 4).

The infra-red head 50 is connected to a microprocessor 65 which is also connected to the memory 60. This is described in more detail in WO-A-00/26861 incorporated herein by reference and so will not be described in detail. The microprocessor 65 is programmed to identify the denomination of the banknote and also its authenticity. In one example, the denomination and authenticity are determined separately. For example, certain regions of the banknote will be reviewed for the purposes of denomination determination while other regions will be reviewed for purposes of authenticity. However, in other applications, particularly if the whole banknote is considered, then a single process can be used to establish both denomination and authenticity.

As far as denomination is concerned, the processor 65 compares all or part of the test pattern stored in the memory 60 with a plurality of reference or prestored patterns in a memory 70. These prestored patterns will have been generated in any conventional manner from a set of genuine banknotes.

Figure 5:
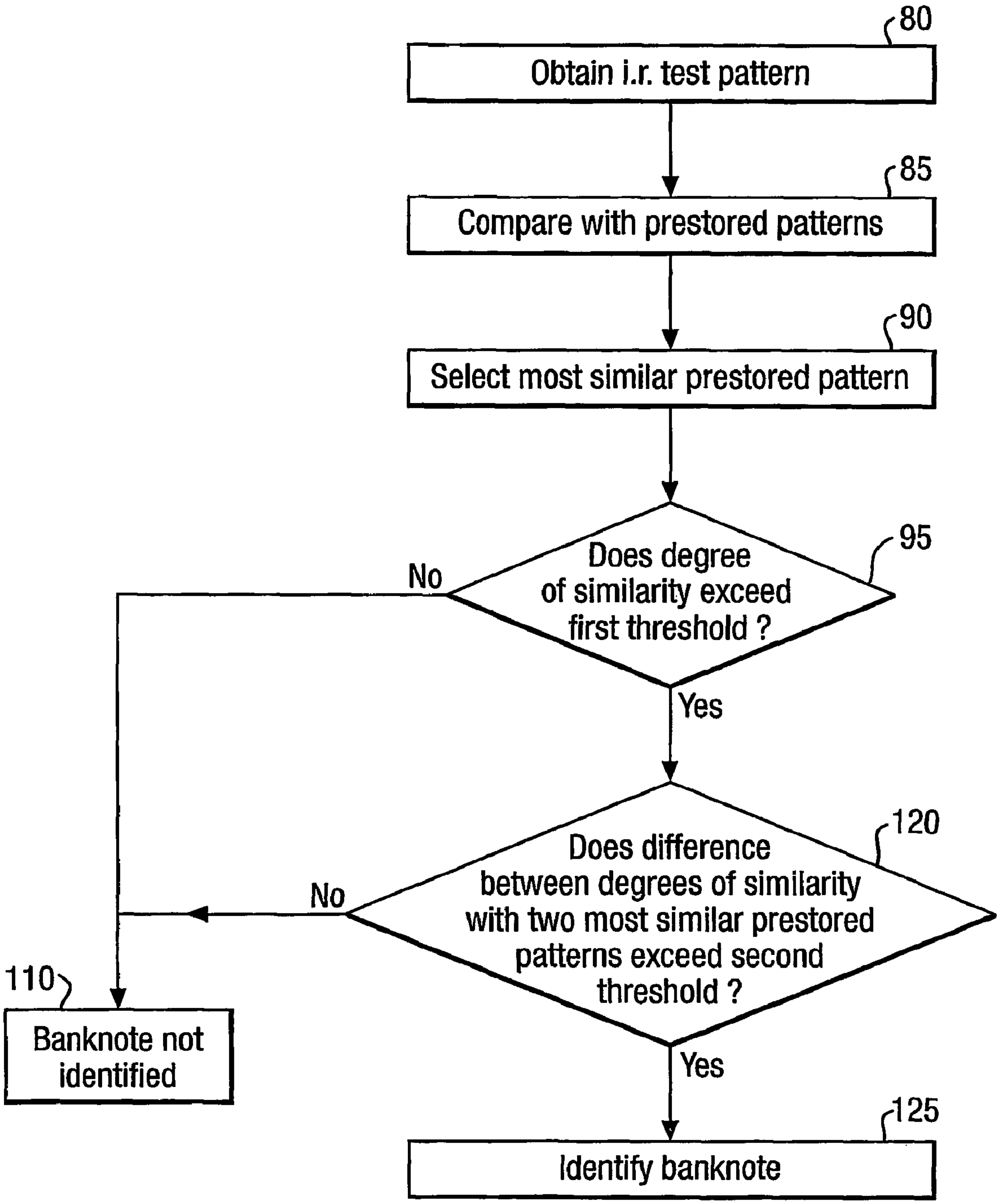
FIG. 5 is a flow diagram illustrating operation of the system.

Thus, as set out in FIG. 5, once the infra-red test pattern has been obtained and stored (step 80), it is compared by the processor 65 with each prestored pattern (step 85). These prestored patterns may define a single banknote in one or more of its possible orientations or a plurality of banknotes also in one or more of their orientations. The processor 65 then selects the most similar prestored pattern (step 90) and determines whether the degree of similarity exceeds a first threshold (step 95). If it does not, then the system determines that the banknote is unrecognizable (step 110). Otherwise, the processor 65 determines whether the difference between the degrees of similarity of the test pattern with the two most similar prestored patterns exceeds a second threshold (step 120) so as to establish whether or not there is a clear match. If there is then the banknote is identified with the most similar prestored pattern (step 125) while otherwise the banknote is considered to be not identified.

The pattern matching technique used in step 85 can be of any conventional type, a preferred approach being described in WO-A-00/26861. Other examples are described in U.S. Pat. No. 4,179,685 and EP-A-0883094.

As mentioned above, the processor 65 could carry out a separate authenticity determination by looking at a particular region of the banknote to see whether the infra-red reflectance satisfies a predetermined condition or alternatively this could be inherent in the pattern recognition process carried out to determine denomination. In either event, if the processor 65 is satisfied that the banknote is authentic and its denomination has been identified it will then control the subsequent processing and handling of the banknote. In this example, the banknote will be allowed to continue on to the output hopper 105 and further banknotes will be fed from the input hopper 2.

If the processor 65 determines that the banknote is not authentic or cannot be identified then the motor 200 is stopped to prevent further banknotes from being fed to the output hopper and a suitable error message will be displayed allowing the operator to remove the suspect banknote.

Figure 6:
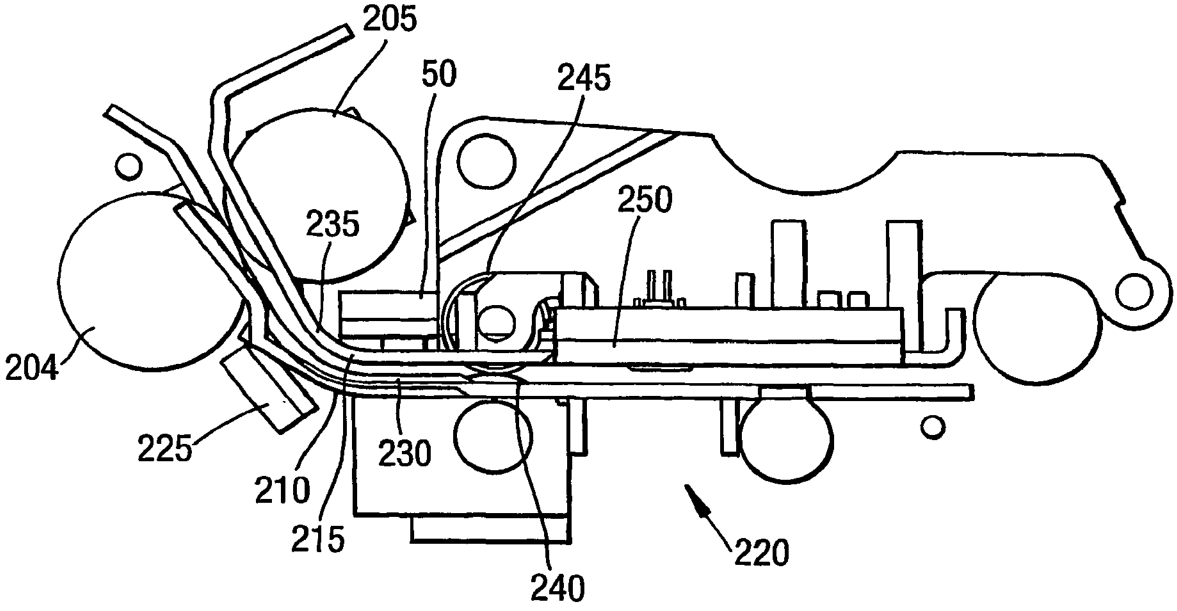
FIG. 6 is a side view of part of a second example of a banknote counter; and, FIG. 7 is a view similar to FIG. 1 but of a further example.

In the example just described, a single IR head 50 was provided. FIG. 6 illustrates part of the transport apparatus of a second example in which banknotes are fed into a nip between a pair of pinch rollers 204,205 and are guided by respective guide plates 210,215 through an inspection station 220 comprising a pair of infra-red heads 50,225 each located opposite a black reference surface 230,235 respectively defined by the guides 210,215 respectively. The head 225 has a similar construction to the head 50. The banknotes pass on through a nip formed by pinch rollers 240,245 and past an optical head 250. FIG. 4 illustrates the connection of these components to the processor 65, those components shown in FIG. 6 but not used in the FIG. 1 example being defined by dashed lines.

In the FIG. 6 example, infra-red images from both sides of the banknote will be obtained and respective comparisons with prestored patterns in the memory 70 will be carried out. Each of these comparisons will lead to a probability of the banknote being identified with a particular prestored pattern. In addition, the optical head 250 enables a visual image of the banknote to be obtained and this can again be compared with prestored reference images to yield a probability that the banknote is a particular denomination. These probabilities can then be combined by the processor 65 to yield a final probability enabling it to make a final decision on the banknote's identity depending upon the resultant probability.

The apparatus shown in FIG. 6 could be incorporated into the FIG. 1 machine.

Alternatively, the detection systems described with reference to FIGS. 1 and 6 could be utilised in other banknote handling machines, particularly a two output pocket machine, the processor 65 being coupled to a diverter 255 which is operated in accordance with the decision reached by the processor to guide a banknote to one or other of the output pockets.

In the case of a transmissive system, the detector(s) would be located on the opposite side of the transport from the corresponding emitter(s) in a similar way to the arrangement shown in WO-A-00/26861.

Figure 7:
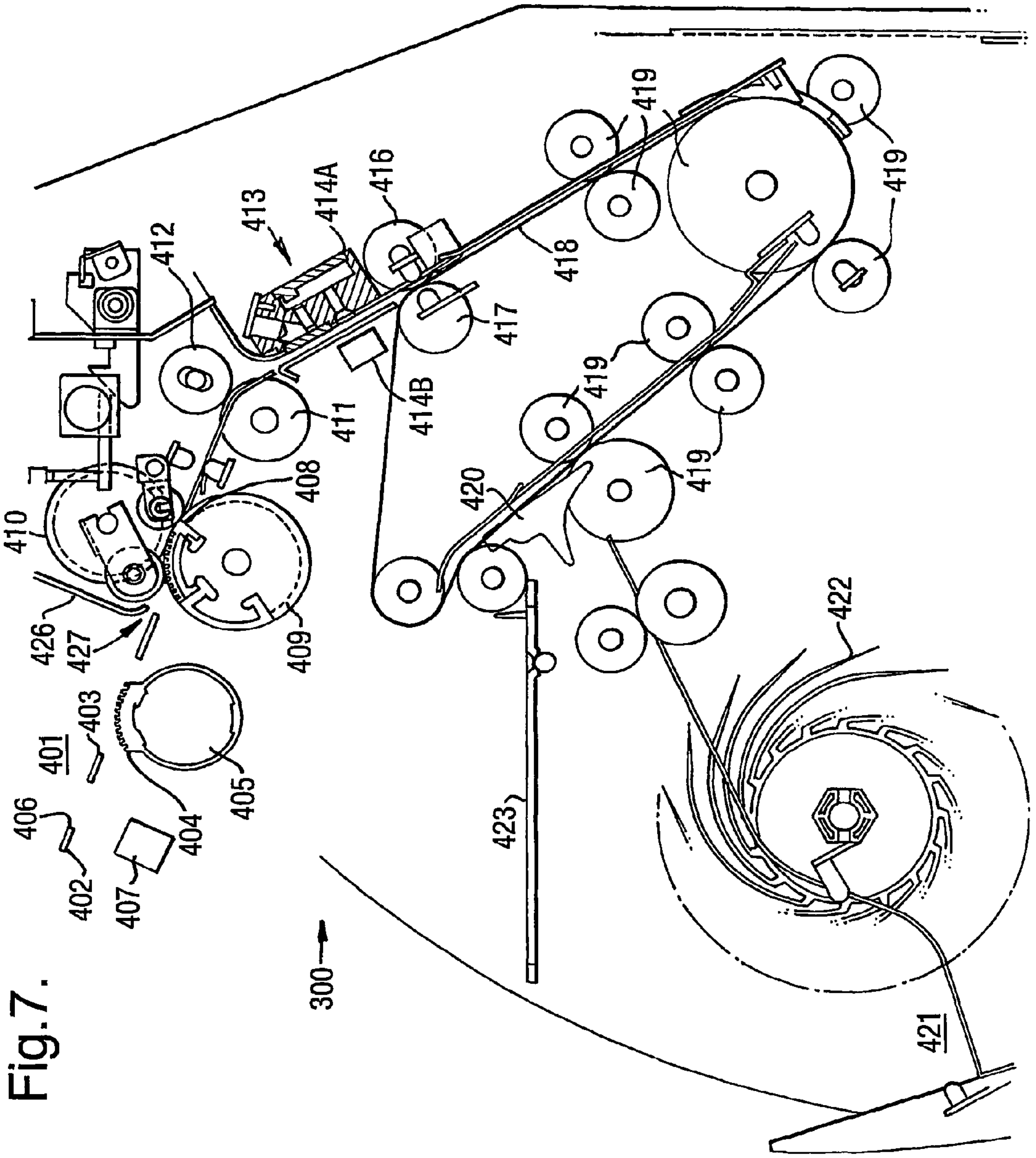

The counter 100 shown in FIG. 1 has a single output hopper 105. The invention is also applicable, however, to counters/sorters having multiple output hoppers and FIG. 7 illustrates such an example with two output hoppers. The FIG. 7 counter 300 has an input hopper 401 having a base 402 with an aperture 403, through which a high friction portion 404 of a nudger wheel 405 can project. The base 402 optionally has a second aperture 406 in alignment with a barcode reader 407 for reading data on note separators. Bank notes are supported in a stack on, the base 402 against a front wall 426, and are fed intermittently by rotation of the nudger roller 405 into a nip 408, between a high friction feed roller 409 and a separate, counter rotating roller 410. The nudger 405 and roller 409 are driven by a motor 200 (not shown). The documents pass through pinch rollers 411,412 into a pattern detection region 413 in which a sensor of a transmission pattern recognition system 414A,414B (414B indicating an infra-red radiation source similar to the array 51 and 414A indicating an array of photodiodes similar to the array 52) scans the bank note as it is fed and passes information back to a microprocessor of the system 414A (not shown). Each bank note is then fed through pinch rollers 416,417 onto a drive belt 418 which conveys the bank note around various rollers 419 to a diverter 420. At least one of the rollers is driven by a motor (not shown). The position of the diverter 420 is controlled by the microprocessor of the system 414A, so that bank notes are guided either towards an output pocket 421, where they are stacked using a rotating stacking wheel 422 in a conventional manner, or to a reject bin 423.

As can be seen, the bank notes are stacked on the base 402 and are urged forward against the front wall 426. A small gap 427 is provided at the base of the front wall, through which individual bank notes and separators can be nudged.

The pattern recognition system 414A,414B operates on the detected image data in an exactly similar way to the pattern recognition system of the previous example, for example as described in WO-A-00/26861. In this case, however, instead of stopping the transport when an unsatisfactory condition is determined such as a double note feed or the like, the diverter 420 is operated so that the unacceptable notes are fed to the reject bin 43.

In another alternative (not shown), in any of these examples bi-colour LEDs or sets of alternately activatable red and i.r. LEDs could be used to obtain visible and i.r. pattern data for subsequent processing by suitably switching activation of the LEDs as the note is scanned.

In all the examples, notes are typically processed at transport speeds in excess of 800 notes per minute, usually in excess of 1200 notes per minute.

The invention claimed is:

1. A method of identifying a document, the method comprising exposing the document to infrared radiation; detecting infrared radiation reflected from or transmitted through a plurality of regions of the document to generate at least one test pattern; determining if the or each test pattern satisfies a predetermined relationship with a predetermined pattern or patterns corresponding to a known document; and, if the predetermined relationship is satisfied, identifying the document as being the same as the known document.

2. A method according to claim 1, wherein the regions are arranged in a regular array.

3. A method according to claim 1, wherein the regions are located on both sides of the document.

4. A method according to claim 1, wherein the regions are arranged in one or more two dimensional arrays.

5. A method according to claim 4, wherein the regions extend over substantially the whole of at least one side of the document.

6. A method according to claim 1, wherein the step of determining if the or each test pattern satisfies a predetermined relationship comprises determining the relationship of the test pattern(s) with a plurality of predetermined patterns corresponding to different documents and/or orientations of documents, and identifying the document under test in accordance with the determined relationship.

7. A method according to claim 1, wherein the step of determining the predetermined relationship includes determining whether the degree of similarity between the test pattern(s) and the or each predetermined pattern corresponding to a known document exceeds a first threshold.

8. A method according to claim 7, wherein the step of determining if the or each test pattern satisfies a predetermined relationship comprises determining the relationship of the test pattern(s) with a plurality of predetermined patterns corresponding to different documents and/or orientations of documents, and identifying the document under test in accordance with the determined relationship, and wherein determining the predetermined relationship further comprises determining the two predetermined patterns which are most similar to the test pattern, and only identifying the document if the difference between the degrees of similarity to the two most similar predetermined patterns exceeds a second threshold.

9. A method according to claim 1, wherein the document comprises a banknote.

10. A method according to claim 9, wherein the banknote is US currency.

11. A method of handling documents, the method comprising:

transporting the documents past an infrared inspection station;

performing an identification method according to claim 1 at the inspection station; and controlling the further transport of the documents in accordance with the outcome of the identification method.

12. A method according to claim 11, further comprising transporting each document to an appropriate one of a plurality of output locations depending upon the outcome of the inspection method.

13. A method according to claim 12, further comprising stopping the transport of the documents if a document is not identified.

14. Document handling apparatus comprising an infrared inspection station; a transport system for transporting documents past the inspection station, the inspection station comprising an infrared radiation emitter and an infrared radiation receiver for detecting infrared radiation reflected from or transmitted through a document; and a control system coupled to the transport system and the infrared inspection station to generate at least one test pattern from the infrared radiation reflected from or transmitted through a plurality of regions of the document, to determine if the or each test pattern satisfies a predetermined relationship with the predetermined pattern or patterns corresponding to a known document, and, if the relationship is satisfied, to identify the document as being the same as the known document, and thereafter to control the transport system accordingly.

15. Apparatus according to claim 14, wherein the infrared inspection station comprises two sets of infrared emitters and detectors arranged on opposite sides of the transport path so as to view opposite sides of the documents.

16. Apparatus according to claim 15, wherein the sets of infrared emitters and detectors are offset from one another in the transport direction.

17. Apparatus according to claim 14, wherein the or each array is arranged opposite a black reference surface.

18. Apparatus according to claim 14, wherein the transport system includes a diverter operable by the control system to divert documents to one of a number of output locations in accordance with the determined identity.

* * * * *